Figure 1:
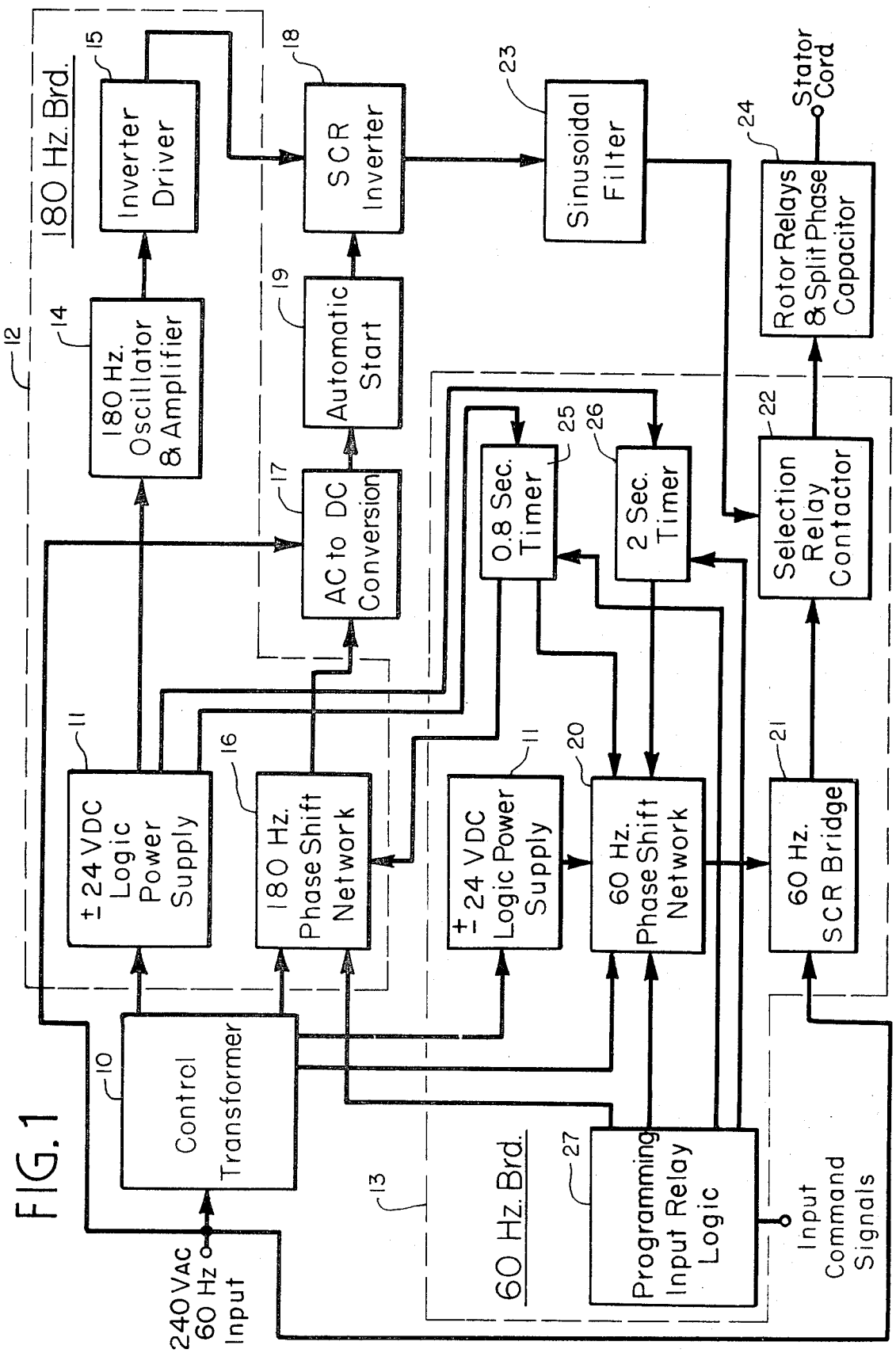

United States Patent

Fiocca

[15] 3,641,408
[45] Feb. 8, 1972

[54] SOLID-STATE POWER SUPPLY SYSTEM FOR ROTATING ANODE X-RAY TUBES

[72] Inventor: Louis L. Fiocca, c/o Advanced Instrument Development Inc. 1001 North 25th Ave., Melrose Park, Ill. 60160

[22] Filed: Aug. 24, 1970

[21] Appl. No.: 66,348

[52] U.S. Cl. ...................... 318/227, 318/230, 318/231, 318/500
[51] Int. Cl. ........................................... H02p 5/40
[58] Field of Search ............... 318/138, 227, 230, 231, 490, 318/500

[56] References Cited

UNITED STATES PATENTS 3,416,057  12/1968  Froyd et al. ................. 318/231 X
3,474,320  10/1969  Chandler .................... 318/227 X
3,482,157  12/1969  Borden et al. .............. 318/227

*Primary Examiner*—Gene Z. Rubinson
*Attorney*—Alter, Weiss & Whitesel

[57] ABSTRACT

A compact solid-state power supply system for rotating anode X-ray tubes. The system includes an AC-to-DC solid state power converter which drives an inverter oscillator using silicon controlled rectifiers. The system provides means for operating the rotating X-ray tube anode at either low or high speeds with automatic braking when going from high speed to low speed. Means are also provided for automatically restarting the system in the event of paralysis of the inverter oscillator. Further, through the use of a novel programmed two-step driving signal, the desired operating speed is reached in a fraction of a second. The unit is compact and lightweight for optimum ease of installation.

18 Claims, 2 Drawing Figures

SOLID-STATE POWER SUPPLY SYSTEM FOR ROTATING ANODE X-RAY TUBES

This invention relates to induction motor power supply systems, and more particularly to power supply systems for motor-driven rotary anodes of X-ray tubes, or the like.

To provide for greatly increased ratings, X-ray tubes have long been provided with rotating anodes to increase the area of electron bombardment. Such anodes are generally driven with split phase motors, and in fact are the rotors of such motors. The motors are operated from power sources capable of providing either 60-Hz. or 180Hz. AC control power to enable operation at anode rotation speeds of about 3,400 r.p.m. or 10,000 r.p.m., respectively. Such two-speed drive systems are greatly preferred over single-speed drives, because the high-speed drive provides greatly improved X-ray tube operating ratings and loadings.

To provide a source of 180 Hz. operating power, various systems have been employed. For example, originally motor-generator sets were used, but these are bulky, noisy and inefficient. More recent systems use thyratron power oscillators driven by a full-wave rectifier operating off the alternating current power supply means through an isolating transformer. While this eliminates the use of rotating machinery other than the anode drive motor itself, such drive systems are nonetheless undesirably inefficient and bulky. Moreover, in addition to the frequent need for thyratron replacement, the thyratron power oscillators in such systems are extremely susceptible to "paralysis" caused by current spikes on starting despite the use of thyratrons with exceptionally high back-voltage ratings. It is necessary to provide a circuit breaker to shut the system off in the event of such paralysis. Restarting is then manually accomplished.

In addition, the prior art systems presently available accelerate relatively slowly in attaining the final operating speed for the X-ray tube anode in the high speed (180 Hz.) operating mode. In general, the rotating anode and its motor drive exhibit mechanical resonances at speeds in the range from 4,000 to 5,000 r.p.m., and it is highly desirable to make the transition through such resonances, both on accelerating and decelerating of the anode as brief as possible to minimize bearing wear of the rotating anode system and to minimize undue strain on the glass envelope and bearing mounts, an thus improve X-ray tube life. In addition, the brief transition through the resonances makes the entire system less noisey.

Accordingly, it is an object of the present invention to provide solid-state power supply systems for rotating X-ray tube anode, or the like, which avoids one or more of the aforementioned disadvantages of prior art systems.

It is a further object of the invention to provide a compact and relatively lightweight solid-state power supply system for use with rotating anode X-ray tubes or as a supply for any inductive motor where the requirements include greatly reduced starting time as compared with prior art systems.

Yet another object of the invention is to provide a compact solid-state power supply system for rotating anode X-ray tubes which provide for operation at a low speed and at a high speed with greatly reduced susceptibility to power oscillator paralysis and with automatic restarting in the event of power oscillator paralysis.

A still further object of the invention is to provide relatively quiet rotating anode X-ray tube systems.

In accordance with an exemplary embodiment of the invention, the rotating anode power supply system comprises a solid-state source of line frequency power and a source of power having a multiple of line frequency. Each power source has means for providing either a normal "running" voltage or a higher "boost" voltage. The boost voltage is used to accelerate the anode to obtain the desired speed of rotation in the shortest possible time. The anode is also automatically braked to reduce the run down time when power is removed from the anode motor or when speed is reduced. The multiple line frequency power source includes an SCR inverter that is provided with an automatic start facility in the event of inverter paralysis. The system further is almost completely automatic, for example, it includes a short time timer and a long time timer for use in controlling the time lengths of the boost voltage.

Figure 2:
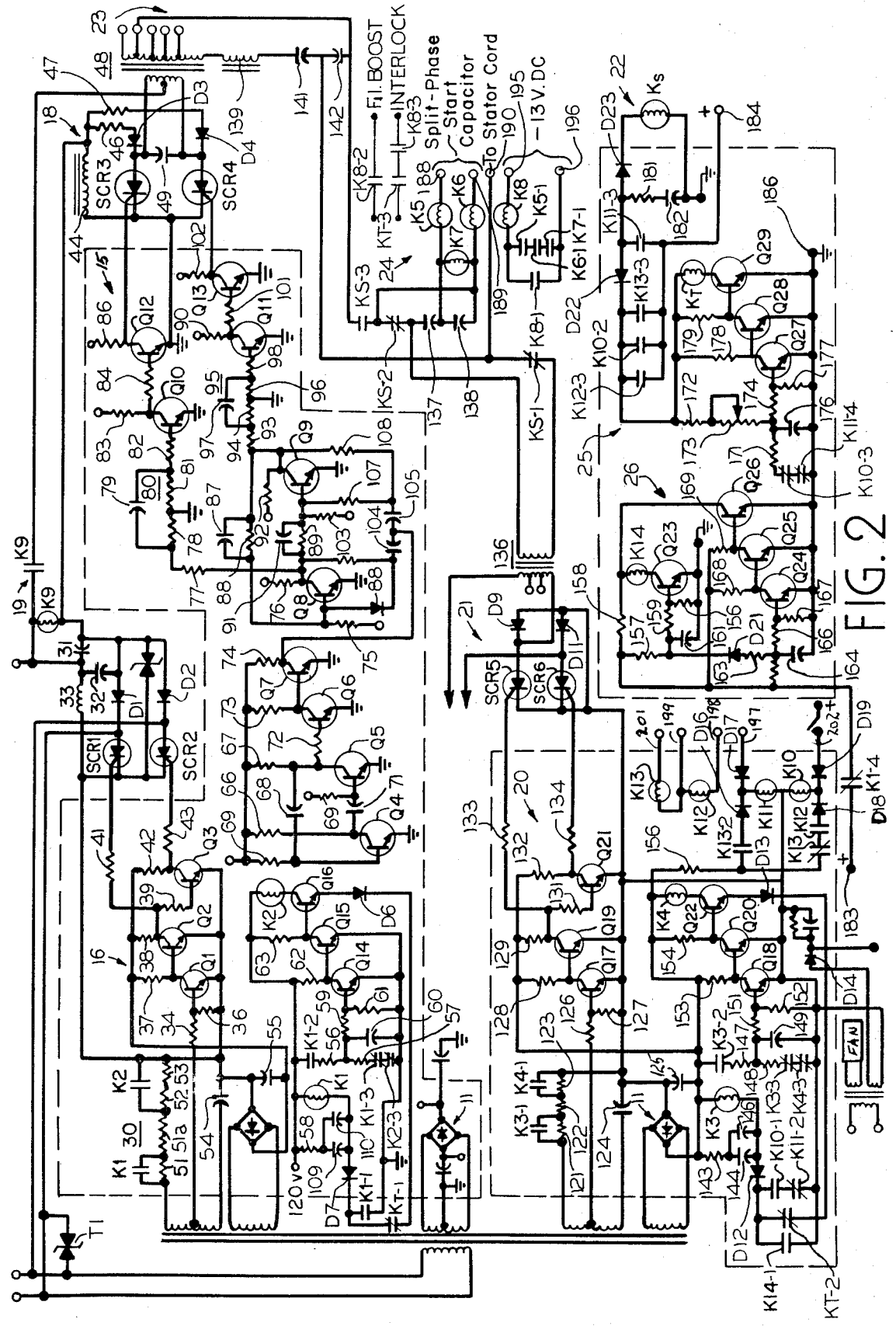

The above mentioned and other objects and features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a block diagram of a solid-state power supply system, which embodies the present invention for the drive motor of a rotating anode X-ray tube; and FIG. 2 is a detailed schematic circuit diagram of the power supply system of FIG. 1 embodying the invention.

In FIG. 1, a supply voltage, such as a 240 volt AC 60 Hz. input voltage, which may be derived from a commercial main power supply, is applied to a control transformer 10. The control transformer 10 supplies operating current to two subassemblies used to provide the line frequency power and the multiple line frequency power. The subassemblies are shown as a 180 Hz. board 12 and a 60 Hz. board 13. Each subassembly is shown including a power supply 11, actually as seen in FIG. 2, this may represent a plurality of power supplies. It should be understood that even though specified frequencies are discussed herein, the system is not limited to such specified frequencies.

In the 180 Hz. board 12, power supply 11 powers means for providing higher frequency power, such as a 180 Hz. oscillator and amplifier 14 which in turn actuates an inverter-driver 15 to generate a square wave control signal ultimately used to drive the rotating motor at the high speed rate.

Means are provided in the multiple line frequency power supply subassembly for controlling the current for enabling operation either at a boosted voltage condition, or at a run voltage condition. More particularly, another 60 Hz. output voltage from control transformer 10 is directed through a 180 Hz. phase shift network 16 to an externally mounted AC-to-DC conversion unit 17. The amplitude of the output signal from unit 17 is a function of the phase shift of network 16.

Means are provided for automatically controlling the amount of phase shift, and consequently determining whether the supply is in the "boost" or "run" mode.

More particularly, programming and timing means are connected to circuits 16 and 17. For example, the AC-to-DC conversion unit 17 includes a DC power supply for developing a programmed DC driving signal for application to an SCR (silicon-controlled rectifier) inverter 18.

Means are provided for automatically restarting the system, such as an automatic start circuit 19, in the event a transient spike extinguishes the inverter 18. The AC-to-DC conversion unit 17 also is connected to receive a 240-volt AC 60 Hz. input from the main powerline.

On the 60 Hz. board 13, there is similarly means for enabling operation at either "run" or "boost" power conditions, such as a 60 Hz. phase shift network 20. Actually, the phase shift network determines whether the system is in the quiescent condition, run condition or boost condition. The network 20 shifts a 60 Hz. input signal to provide a phase shifted output signal from control transformer 10 to a 60 Hz. SCR (silicon-controlled rectifier) bridge circuit 21. The output signal amplitude of the bridge circuit 21 is a function of the amount of phase shift provided to the circuit 21.

Means, such as selection relay contactor unit 22, are provided for selecting either the regular rotational speed drive or the higher rotational speed drive. Selection relay contactor unit 22 receives both the sine wave component of the output signal from SCR inverter 18, applied thereto by means of a sinusoidal filter 23 and the output of bridge circuit 21. The selection relay contactor unit 22 in turn is coupled through the rotor relay circuits and split phase capacitor network to the stator cord terminal which is adapted to be connected to the stator circuit of the drive motor for the rotating anode of the associated X-ray tube (not shown).

Means are provided for automatically timing the boost condition of said subassemblies. In greater detail, board 13 also includes a pair of timers There is a short-time (0.8 second for example) timer 25 which is powered by DC logic power supply 11 and is coupled to phase shift networks 16 and 20, and a long-time (2 second, for example) timer 26, also powered by power supply 11, which is coupled only to a 60 Hz. phase shift network 20. The 60 Hz. shift network 20 controls the output amplitude of a 60 Hz. SCR bridge network 21, which is powered by a 240 volt AC 60 Hz. input from the main power supply. Board 13 is also provided with programming input relay logic circuitry 27 which, as indicated by the legend, responds to input command signals and controls phase shift networks 16 and 20 and timers 25 and 26.

In operation, the 240 volt AC 60 Hz. input voltage applied to control transformer 10 supplies the 24 volt DC logic power supply 11, the 180 Hz. phase shift network 16, and the 60 Hz. phase shift network 20 with appropriate 60 Hz. input voltages. Power supply 11 generates DC output voltages of approximately 24 volts which are employed to supply the 180 Hz. oscillator and amplifier 14, the timers 25 and 26, and the 60 Hz. phase shift network 20 with appropriate operating voltages.

Means are provided for supplying the anode motor with high-speed synchronous driving power. For example, unit 14 develops a 180 Hz. output signal which is supplied through inverter driver 15 to SCR inverter 18 to develop a 180 Hz. square wave output signal. A sinusoidal filter 23 derives the fundamental component of the square wave output from SCR inverter 18 to deliver a sine wave 180 Hz. output signal to selection relay contactor unit 22 and thence, when the system is in the 180 Hz. operating mode, through rotor relays and split phase capacitor unit 24 to the stator terminals of the drive motor for the X-ray anode tube.

The AC-to-DC conversion unit 17 receives a 240 volt AC 60 Hz. input voltage from the main power supply and is controlled by programming input relay logic system 27 through 180 Hz. phase shift network 16 to deliver the programmed two-step input voltage through automatic start unit 19 to SCR inverter 18.

The short time timer unit 25 is employed in the 180 Hz. mode to control phase shift network 16 in connection with the programming of the two-step input voltage for SCR inverter 18.

In the 60 Hz. operating mode, programming input relay logic system 27 controls the 60 Hz. phase shift network 20, in conjunction with the long time timer 26 and the short time timer 25, to turn on the 60 Hz. SCR bridge 21 which is supplied from the main power supply with a 240 volt 60 Hz. AC input signal voltage. The output from SCR bridge 21 is applied to selection relay contactor unit 22, and in the 60 Hz. operating mode, this voltage is applied through rotor relays and split phase capacitor unit 24 to the input terminals of the X-ray drive motor stator.

The construction and operation of the system can be appreciated in greater detail from the detailed schematic circuit diagram of FIG. 2. This exemplary system uses transistors and relays which derive power from 5 DC power supplies on two printed circuit board assemblies. For convenience, transistors are conventionally designated by Q numbers from Q1 to Q29, inclusive, while relays are designated with K/number (or K/letter) combinations. Contacts associated with each relay bear the same K/number combination designations followed by a —No.; thus the first contact referred to of relay K1 is designated as contact K1-1. Normally, open contacts are shown as a pair of spaced parallel plates, while normally closed contacts have a slanted crossline bridging the contacts. Conventional symbols are used for each of the components and the operation of the system will be described in detail by reference to the several transistors and relays, respectively.

Input phase control means, such as network 16 including the resistance-capacitance network 30 are provided at the input of the 180 Hz. board. The sinusoidal phase-shifted signal from the resistance-capacitance network 30 acts as the input to transistor Q1. When the normally open contacts K1-1 and Kz-1 associated with phase shift network 30 are both open, as in the quiescent state (idle condition), nearly 180° of phase shift occurs so that the firing angles of SCR1 and SCR2 of AC-to-DC conversion unit 17 (FIG. 1) are nearly zero.

On closing of contacts K1-1 and Kz-1, the resistors bridging these contacts are shorted out and the resulting phase shift then approaches 0° so that the firing angles of SCR1 and SCR2 are such as to sustain nearly 180° of conduction in each cycle. This is the boost condition, and will allow maximum current flow in the full-wave SCR bridge comprising silicon-controlled rectifiers SCR1 and SCR2, charging the output capacitors 31 and 32 through a series air core choke coil 33.

The charge on capacitors 31 and 32 provides an increased DC voltage or the "boost" condition. The boosted voltage constitutes the B+ supply for the 180 Hz. SCR inverter section 18 (FIG. 1). In the run condition, only contact K1-1 is closed while contact Kz-1 is open, and this provides a phase shift of approximately 110° or a firing angle of 70°, in the bridge circuit comprising SCR1 and SCR2. The charge on capacitors 31 and 32 in the run condition is a reduced DC voltage, and the inverter runs at this reduced voltage level.

The base of transistor Q1 is tied to the phase shifted sinusoidal signal through coupling resistor 34 and a portion of the secondary of control transformer 10. Resistor 36 provides biasing for the base of transistor Q1. The collector of transistor Q1 is connected to B+ through load resistor 37 and the emitter is connected directly to B— as provided by power supply 11.

The output of transistor Q1 is a square wave which is coupled directly to the base of transistor Q2 to switch transistor Q2 which in turn switches transistor Q3. Therefore, the outputs of transistors Q2 and Q3 are always 180° out of phase with each other. These output signals each supply 50 milliamperes 50 gate current drive to SCR1 and SCR2, respectively.

It should be noted that the rest of the biasing, coupling and output resistors will not be described hereinafter to preclude needlessly burdening the description of the operation of the inventive supply. Table 1, however, is attached to give exemplary values of the components shown in the drawings.

Transistors Q4, Q5, Q6, Q7, Q8 and Q9 and their associated circuit components constitute the 180 Hz. Oscillator and Amplifier unit 14 of FIG. 1. Transistors Q4 and Q5 are connected in a conventional multivibrator oscillator circuit having a frequency of oscillation of 360 Hz.

The signal output from the multivibrator comprising transistors Q4 and Q5 is amplified and shaped with transistors Q6 and Q7. The output of transistor Q7 is a square-wave with a sharp falling edge in order to trigger the flip-flop circuit comprising transistors Q8 and Q9. The flip-flop circuit comprising transistors Q8 and Q9 divides the 360 Hz. operating frequency from the Q7 driver transistor by a factor of two to provide an output signal between the collectors of transistors Q8 and Q9 in the form of 180 Hz. square wave 50 percent duty cycle wave forms.

Transistors Q10, Q11, Q12 and Q13, and their associated circuit components constitute the inverter driver circuit 15 of FIG. 1. The outputs of the flip-flop circuits comprising transistors Q8 and Q9 are differentiated by the networks 79 and 90, and the differentiated pulses are current-amplified by transistors Q10, Q12 and Q11, Q13, respectively.

In an exemplary embodiment, transistors Q12 and Q13 supply 100 milliamperes each to SCR3 and SCR4 of the 180 Hz. SCR inverter unit (FIG. 1). These current pulses of 100 milliamperes occur each 5.5 milliseconds and are 2.75 milliseconds apart and have a pulse duration of 200 microseconds.

Silicon-controlled rectifiers, SCR3 and SCR4 are connected to provide a free-running inverter commutated by capacitor 49 in a conventional McMurray-Bedford inverter circuit, which drives into the primary winding of an inverter transformer 37.

Transistors Q14, Q15, Q16, Q18, Q20 and Q22 and their associated circuit components constitute the programmed input relay logic system 27 of FIG. 1.

When the 180 Hz. control (not shown) is actuated, relay K11 operates due to the voltage applied between the positive voltage applied to terminal 197 and B— obtained from supply 11. Responsive thereto, contacts K11-1 in the input circuit to transistor Q14 closes, and relay K1 is activated over the circuit extending from a 24v. source through the K1 relay coil, diode D1, contacts K11-1 to ground. The capacitor 60 in the input circuit between the base and the emitter of transistor Q14 charges from the 24 volt source through contacts K1-2 and thereby causes a time delay of approximately 50 milliseconds before transistors Q14, Q15 and Q16 change states. When the charge reaches approximately 3 volts, transistor Q14 becomes conductive and this in turn cuts off transistor Q15 which triggers transistor Q16 to the "ON" state. Relay K2 is now energized through the circuit including transistor Q16, diode D1 and the normally closed contacts KT-1 of timing relay K to ground. The operation of relays K1 and K2 now initiate the high-speed power boost condition which accelerates the motor to bring it up to synchronous speed in a fraction of the time required with other presently available equipment.

Timing relay contacts KT-1 open after a delay that is determined by the short time timer 25. The short time timer comprises transistors Q27, Q28 and Q29. The operation of the timer circuit 25 will be explained further in the specification. Responsive to the opening of contacts KT-1, relay K2 drops out which places the 180 Hz. supply into the run condition. The circuit comprising transistors Q14, Q15 and Q16 which control relay K2 is the programmed input relay logic circuitry for the high-speed operation.

The operation of transistors Q18, Q20 and Q22 in subassembly 13 is almost identical to that of transistors Q14, Q15 and Q16. Relays K3 and K4 determine the boost and run conditions for the 60 Hz. mode of operation responsive to the operation of relay K10 in a manner analogous to relays K1 and K2 in the high-speed operation condition.

Transistors Q17, Q19 and Q21 and their associated circuit components constitute the 60 Hz. phase shift network 20 of FIG. 1, and their operation is almost identical to that of transistors Q1, Q2 and Q3 of the 180 Hz. phase shift network 16 (FIG. 1). Transistors Q18 and Q21 supply 50 milliamperes of gate signal through resistors 133 and 134, respectively, to the bridge circuit comprising silicon-controlled rectifiers SCR5 and SCR6. This the 60 Hz. bridge circuit 21 and it is coupled to a 2-to-1 stepdown transformer 42 as the controlled element.

The phase shift firing angle of the bridge circuit comprising SCR5 and SCR6 is controlled so that in the 60 Hz. boost condition, transformer 136 approaches a conduction angle of 360°. In the 60 Hz. run cycle, the conduction angle is approximately 140°. In this manner, the RMS voltage at the secondary side of transformer 136 is either 115 volts AC (boost), 40 volts AC (run) or nearly zero (idle).

Transistors Q23, Q24, Q25 and Q26 and their associated circuit elements constitute the long time timer unit 26 of FIG. 1. When the 180 Hz. mode of operation is discontinued, relay K1 is deenergized and the +24 VDC terminal 183 is switched through the normally closed K1-4 contacts into the input circuits of transistors Q23 and Q24. The capacitor 161 between base and emitter of transistor Q23 acts as a slug; i.e., it charges through resistor 157 for approximately one-half second until the voltage is sufficient to turn on transistor Q23 which in turn energizes braking relay K14. The energized braking relay applies a braking force to the anode through contacts K-1. When the normally open contacts K14-1 at the lower left-hand portion of the circuit diagram close, relay K3 is energized. Responsive thereto, transistor Q18 switches to its conductive state causing transistor Q20 to switch to its nonconductive state. When transistor Q20 is nonconductive, transistor Q21 is biased to conduct and thereby energize relay K4. Thus, relay K3 and K4 are energized, and this now initiates the 60 Hz. boost mode of operation, which acts to brake the anode and drop it to the lower rotational speed in a shorter time.

The input capacitor 164 of transistor Q24 then charges through resistor 46 for approximately 2.5 seconds until the voltage is sufficient to turn on transistor Q24. When transistor Q24 becomes conductive, this causes transistor Q25 to become nonconductive and transistor Q26 to become conductive, and this causes the ground from terminal 186 to be applied to the common side of the K14 relay coil thus causing relay K14 to deenergize and terminate the braking cycle.

Transistors Q27, Q28 and Q29 and their associated circuit components constitute the short time timer 25 of FIG. 1. When any of the normally open contacts of relays K10, K11, K12 or K13 are closed, then the +24 VDC terminal 184 is applied to charge capacitor 176 through a resistor 172 and a potentiometer 173 until the voltage is sufficient to make transistor Q27 conductive. When transistor Q27 conducts transistor Q28 turns off and makes transistor Q29 conductive to energize timing relay KT. This short boost time is factory calibrated by adjustment of potentiometer 173 to provide a total turn-on time for relay KT of 0.8 second. The operation of relay KT opens contacts KT-1, KT-2 (as previously explained) to deenergize relay K1, K3, respectively and return the system to the run condition from the boost condition.

In operation, when the 60 cycle or 3,400 r.p.m. mode of operation is desired, a voltage is applied through controls in the X-ray equipment (not shown) to apply 12 volts to terminal 202. The 12 volts thus applied actuates relay K10 by extending the positive voltage through diode D19, the coil of relay K10, to negative voltage received from a portion of power supply 11.

Responsive to the energization of coil K10, contacts K10-1 operate to close a path for operating relay coil K3 through a path that extends from the negative voltage, through normally closed contacts K11-2, contacts K10-1, diode D12 and the coil of relay K3 to positive voltage received from a portion of power supply 11.

Another set of contacts of relay K10; namely, contacts K10-2 also close to establish a circuit for operating the timing relay KT. The timing relay KT, as previously explained, is in the short time timer circuits 25 and operated to automatically limit the boost voltage operate times. Thus, the closure of the normally open relay contacts K10-2 applies 24 volts that is on terminal 184 to charge capacitor 176 through the circuit that extends from terminal 184 through relay contacts K10-2, resistor 172, potentiometer 173, and through capacitor 176 to ground on terminal 186. When the charge on capacitor 48 builds up sufficiently (0.8 sec. in an exemplary embodiment) to switch the normally nonconductive transistor Q27 to conduct and to turn off normally conducting transistor Q28 to turn on normally nonconducting transistor Q29 and energize timing relay KT. During that 800 millisecond time period required to operate relay KT, relay K3, of course, is operated. The operation of relay K3 closes a circuit that enables the operation of relay K4. More particularly, normally open contacts K3-2 close to extend positive voltage from a portion of power supply 11 through contacts K3-2 and resistor 147 to charge capacitor C6. The charging of capacitor C6 delays the operation of switching transistor Q18 from its normally nonconducting state to its conducting state by a period of approximately 50 milliseconds. As soon as it charges sufficiently, however, the bias is applied to the base of transistor Q18 through resistor 151 and biasing resistor 152. Transistor Q18 in its conducting state causes transistor Q20 to switch from its conducting to its nonconducting state, and consequently to switch transistor Q22 to its conducting state to energize relay coil K4 over the circuit that extends from positive voltage of power supply 11 through transistor Q22, OR-gate diode D12, to negative voltage. Contacts KT-2 remain normally closed since relay coil KT is not energized at this time because of the 800 millisecond delay. When relays K3 and K4 are both energized, contacts K3–1 and K4–1 close to place the 60 Hz. subassembly in boost condition, as previously explained. As soon as relay KT energized, then contacts KT–2 open to deenergize relay K4 and place the 60 Hz. subassembly into the run condition.

When the signal is removed from the coil of relay K10, then contacts K10–1 return to the normal condition removing energization power from the coil of relay K3. Thus, both contacts K3–1 and K4–1 no longer short out resistors 121 and 123, respectively. At this point, the subassembly is in the idle condition.

It should be noted that normally output stator power is supplied to the transformer 136 of the 60 Hz. subassembly. The power extends from the bottom side of the secondary of transformer 136 through the closed contacts KS–1 to terminal 190 and from the top side of the secondary of transformer 36 through normally closed contact KS–2, the coil of relay K6 to terminal 189. The top sides of the secondary of transformer 136 is also tied to terminal 188 through capacitors 137 and 138 in parallel and the coil of relay K5.

The 180 Hz. operation is similar in many respects to the 60 Hz. operation. When a positive voltage is applied to terminal 197 in any well known manner, then relay K11 is energized over a circuit that extends from the positive voltage through diode D17 through the coil of relay K11 to negative voltage received from a portion of power supply 11.

The operation of relay K11 enables the operation of relay K1 over a circuit that extends from positive voltage, through the coil of relay K1, diode D7, the now closed normally open contacts K11–1 to ground. The energization of the coil of relay K1, of course, closes contacts K1–1 to short out resistor 51 and vary the phase of the output of the 180° phase shift network. At the same time, contacts K1–2 also close to start a programming input relay logic operation. More particularly, normally nonconducting transistor Q14 is caused to conduct after capacitor 60 builds up sufficient charge. In an exemplary embodiment of the invention, this takes about 50 milliseconds. Coupling resistor 59 couples the base of transistor Q14 and resistor 61 biases that base to switch the normally nonconducting transistor Q14 to the conducting stage. Responsive thereto, transistor Q15 is switched from the normally conducting stage to the nonconducting stage. It should be noted that the base of transistor Q15 is directly coupled to the bias resistor 62 of transistor Q14. Similarly, normally nonconducting transistor Q16 is switched to the conducting stage because the base of transistor Q16 is tied to the junction point of load resistor 63, and the collector of transistor Q15 when transistor Q15 switches and energizes the coil of relay K2.

The energization circuit extends from positive voltage through the coil of relay K2, transistor Q16, diode D6, closed contacts KT–1 of timing relay KT, diode D7 to negative voltage.

The operation of relay K2 closes a normally open contact K2–1 to further vary the phase of the output signals of the 180 Hz. phase shift network. This maximizes the voltage output of circuit 17, as previously described, so that the 180 Hz. subassembly is operating in the boost condition.

The boost condition lasts until relay KT is energized as explained with reference to the 60 Hz. subassembly. The operation of relay KT opens contacts KT–1 to remove the operating circuit for relay K2. When only relay K1 is operated, then the phase shift of the 180 Hz. phase shift circuit is such as to provide a run voltage condition.

It should be noted that a discharge circuit is provided for both capacitors 60 and 149 through contacts K1–3, K2–3 and K3–3, K4–3, respectively. This run down circuit functions when the circuit is turned off.

The operation of the timing relay KT is the 180 Hz. mode is initiated by the operation of relay K11 through contacts K11–2 instead of contacts K10–2.

Means are provided for assuring that the output to the stator is provided by the 180 Hz. circuit instead of by the 60 Hz. circuit. More particularly, relay KS is operated responsive to the operation of relay K11 over circuit that extends from positive voltage of terminal 184 through contacts K11–2, diode D23 and the coil of relay KS to ground. The actual operation of relay KS is delayed by the series circuit comprising resistor 181 and capacitor 182. It should be noted that when contacts K10–2 operate, diode D23 prevents the consequent operation of relay KS.

Responsive to the operation of relay KS, contacts KS–1 open to disconnect transformer 136 from the output stator cord circuit. Contacts KS–2 open to remove capacitor 137 from the circuit and contacts KS–3 close to connect the sinusoidal filter comprising inductor 139 and capacitors 141 and 142 in series with terminals 189 and 190, respectively. At this time, capacitor 137 is no longer in the circuit. Capacitor 138 is bridged across terminals 195 and 196.

Means are also provided for braking the rotor to slow it down when either stopping or changing from the high speed to the normal condition. More particularly, braking relay K14 is provided. Relay K14 operates responsive to a circuit that extends from positive voltage at terminal 183 through contacts K1–4, normally closed, resistor 158 to the top side of the coil of braking relay K14. The bottom side of the coil of braking relay K14 is connected to the collector of transistor Q23.

It should be noted that transistor Q23 goes from the normally nonconducting condition to the conducting condition responsive to the positive voltage received through contacts K1–4 and resistor 157 which charges capacitor 161 in approximately 20 seconds. Thus, the braking relay is actuated twenty seconds after relay K1 returns to normal.

It also should be noted that the relay K1 release time is affected by the presence of resistor 58 in series with the parallel capacitors 104 and 110. These capacitors discharge through resistor 58 and the coil of relay K1 to cause relay K1 to be slow to release.

The switching of transistor Q23 energizes the braking relay K14. The braking relay causes braking power to be transmitted to the anode to brake it. In greater detail, responsive to the energization of relay K14, contacts K14–1 close in the 60 cycle subassembly and provide an operating circuit for relay K3 in parallel to the previously discussed operating circuit utilizing contacts K10–1. Thus, the time of operation of the the high-speed circuit is limited by the braking relay. In other words, as soon as the braking relay operates, then relay K3 operates with its subsequent operation of relay K4. The operation of the braking circuit is initiated by the removal of the positive voltage from the input to K11. The operation of relay K10 is caused by the application of power thereto which may be responsive to the operation of the braking relay K14. Thus, the power from transformer 137 is switched to the output instead of the power of transformer 48. Accordingly, approximately 800 milliseconds after the initiation of the 180 Hz. or high-speed mode of operation, boost voltage is removed, and "run" voltage is supplied. Within approximately 20 seconds after the initiation of the high-speed mode, braking power is applied and the low-speed mode is either automatically or manually initiated. Upon going to the low-speed mode, a boost condition is initiated and braking is applied for approximately 2 seconds under the control of timing circuit 26. At the end of the two seconds, Q26 switches to the conducting condition to deenergize braking relay K41 as has previously been described.

Means are provided for operation on the low-speed mode responsive to actuation of a fluoroscope switch. More particularly, relay K12 is energized by the operation of a fluoroscope switch that applies positive voltage to terminal 198 through the coil of relay K12 to ground at terminal 199. The operation of relay K12 closes contacts K12–1 to apply positive voltage from power supply 11 through resistor 156, normally closed contacts K13–1, contacts K12–1, the coil of relay K10 to negative voltage from power supply 11. The previously described operation of the 60 Hz. mode is thus automatically placed into effect.

Similarly, means are provided for high-speed operation responsive to the actuation of a spot film switch to enable filming from the fluoroscope mode. Positive voltage is applied to terminal 201 through the coil of relay K13 to ground at terminal 199. The operation of relay K13 then opens contacts K13-1 and closes contact K13-2. The closing of contacts K13-2 enables relay K11 to be energized over the circuit extending from positive voltage through resistor 156, closed contacts K13-2, diode D16 and through the coil of relay K11 to negative voltage supply from power supply 11.

The operation of contacts K13-1 to the open position keeps relay K10 from operating.

It should be noted that series contacts K10-3 and K11-4 are provided for bleeding capacitor 176 when neither of those relays are operated.

Means are provided for automatically restarting the inverter in the event of the SCR inverter 17 is upset, as for example, by a transient. In that case, both SCR3 and SCR4 would be in a steady-state condition and would present a "short-circuit" condition to the B+ supply. The B+ supply would then collapse and consequently relay K9 would be deenergized to open contacts K9-1 and remove the b+ from the inverter. Consequently, SCR3 and the SCR4 would turn off and return to the normal free running mode; thereby, removing the short circuit and K9 would again be energized. Thus, the paralysis condition is automatically corrected by means such as mode monitoring relay K9.

Means are provided for monitoring the stator cord circuit to determine whether or not boost current is being delivered into the stator of the X-ray tube. More particularly, current relays K5 and K6 appear in series with terminals 188 and 189, respectively. Relay K7 is a voltage relay placed across a split phase start capacitor. It monitors the capacitor voltage in the boost condition.

K8 is a slave relay that operates responsive to the operation of contacts K5-1, K6-1 and K7-1, which occurs only in the boost condition. When relay K8 is energized, contacts K8-1 close to lock it in.

The relays discussed also may be used to control various operations of the X-ray equipment. For example, the operation of relay K8 indicates the boost condition, and contacts K8-2 energizes a filament boost circuit. Also, the series circuit of contacts KT-3 and K8-3 provides an interlock circuit.

The circuitry described is equipped with various devices for precluding adverse effects due to inductive kickback. For example, the inverter circuit utilizes flyback diodes such as diodes D3, D4. Also, thyrectors T1, T2 are used.

Thus, the circuitry presented automatically provides a high- and a low-speed operating mode. Braking is applied between the high-speed and the low-speed modes. Boost and run voltages are supplied for each mode. The switching is almost all automatically accomplished, and the operation is relatively quiet.

While the principles of the invention have been described above in connection with specific apparatus, it is to be clearly understood that this description is made only by way of example and not as a limitation on the scope of the invention.

TABLE I

60 Hz. FREQUENCY CONTROL (A-2)

RESISTORS

| Reference Number | Component Value | |
|---|---|---|
| 121 | 18K | 1/2w. |
| 122 | 400 ohm | 5w. |
| 123 | 2.2K | 3w. |
| 126 | 10K | 1w. |
| 127 | 10K | 1/2w. |
| 128 | 2.2K | 1/2w. |
| 129 | 220 ohm | 1w. |
| 131 | 2.2K | 1/2w. |
| 132 | 220 ohm | 1w. |
| 133 | 220 ohm | 1w. |
| 134 | 220 ohm | 1w. |
| 143 | 470 ohm | 1/2w. |
| 147 | 22K | 1/2w. |
| 148 | 100 ohm | 1/2w. |
| 151 | 10K | 1/2w. |
| 152 | 10K | 1/2w. |
| 153 | 10K | 1/2w. |
| 154 | 1K | 1/2w. |
| 156 | 22K | 1/2w. |
| 157 | 1K | 1/2w. |
| 158 | 120 ohm | 5w. |
| 159 | 10K | 1/2w. |
| 163 | 47K | 1/2w. |
| 165 | 470K | 1/2w. |
| 166 | 39K | 1/2w. |
| 167 | 22K | 1/2w. |
| 168 | 39K | 1/2w. |
| 169 | 2.7K | 1/2w. |
| 171 | 100K | 1/2w. |
| 172 | 33K | 1/2w. |
| 173 | 100K | (Potentiometer) |
| 174 | 22K | 1/2w. |
| 177 | 22K | 1/2w. |
| 178 | 22K | 1/2w. |
| 179 | 2.2K | 1/2w. |
| 181 | 270K | 1/2w. |

CAPACITORS

| | | |
|---|---|---|
| 124 | 2mfd. | 200VDC |
| 125 | 640mfd. | 25VDC |
| 144 | 10mfd. | 25VDC |
| 146 | 10mfd. | 25VDC |
| 149 | 25mfd. | 25VDC |
| 161 | 100mfd. | 40VDC |
| 164 | 200mfd. | 25VDC |
| 176 | 100mfd. | 40VDC |
| 182 | 100mfd. | 40VDC |

TABLE II

180 Hz. FREQUENCY CONTROL (A-1)

RESISTORS

| Reference Numbers | Component Value | |
|---|---|---|
| 34 | 10K | 1w. |
| 36 | 10K | 1/2w. |
| 37 | 2.2K | 1/2w. |
| 38 | 220 ohm | 1/2w. |
| 39 | 2.2K | 1/2w. |
| 41 | 220 ohm | 1w. |
| 43 | 220 ohm | 1w. |
| 45 | 220 ohm | 1w. |
| 51 | 6.8K | 1 |
| 51a | 400 ohm | 3w. |
| 52 | 1K | 1w. |
| 53 | 1K | 1w. |
| 56 | 22K | 1/2w. |
| 57 | 100 ohm | 1/2w. |
| 58 | 470 ohm | 1/2w. |
| 59 | 10K | 1/2w. |
| 61 | 10K | 1/2w. |
| 62 | 10K | 1/2w. |
| 63 | 1K | 1/2w. |
| 64 | 50K | (Potentiometer) |
| 66 | 3.9K | 1/2w. |
| 67 | 3.9K | 1/2w. |
| 69 | 22K | 1/2w. |
| 72 | 39K | 1/2w. |
| 73 | 3.9K | 1/2w. |
| 74 | 1K | 1/2w. |
| 75 | 100K | 1/2w. |

| | | |
|---|---|---|
| 76 | 1K | 1/2w. |
| 77 | 3.9K | 1/2w. |
| 78 | 3.9K | 1/2w. |
| 81 | 10K | 1/2w. |
| 82 | 10K | 1/2w. |
| 83 | 5.6K | 1/2w. |
| 84 | 1K | 1/2w. |
| 86 | 200 ohm | 3 w. |
| 88 | 5.6K | 1/2w. |
| 89 | 5.6K | 1/2w. |
| 92 | 1K | 1/2w. |
| 93 | 3.9K | 1/2w. |
| 94 | 3.9K | 1/2w. |
| 96 | 10K | 1/2w. |
| 98 | 10K | 1/2w. |
| 99 | 5.6K | 1/2w. |
| 101 | 1K | 1/2w. |
| 102 | 200 ohm | 3w. |
| 103 | 100K | 1/2w. |
| 105 | 5.6K | 1/2w. |
| 108 | 5.6K | 1/2w. |

TRANSISTORS

Q1–Q2–Q3–Q4–Q5–Q6–Q7–Q8–Q9–Q10–Q11–Q12–Q13–Q14Q15–Q16–All Transistors RCA 40347

I claim:

1. An induction motor supply system such as used for powering rotating anode X-ray tubes, wherein the X-ray tube anode is either driven by the motor rotor or is the motor rotor, said power supply system comprising a first solid-state power source for supplying normal power required for driving the rotor of said motor at a first running speed, a second solid-state power source for supplying normal power required for driving the rotor of said motor at a second running speed, said second speed being higher than said first speed, boost means for increasing the power to the motor for a predetermined period of time above the normal running power to accelerate the rotor while attaining said first and second running speeds, means for decreasing said power to the normal running power after said predetermined period of time, and means for selectively connecting the stator of said motor to either said first or said second power sources.

2. The power supply system of claim 1 wherein boost timing means are provided for automatically limiting the operating time of said boost means.

3. The power supply of claim 1 wherein means are provided for monitoring said boost means to ascertain operation thereof.

4. The power supply system of claim 1 wherein said first solid-state power source means comprises control transformer means for coupling to a power line to provide low voltage at line frequency, means for coupling said line frequency signal from the secondary of said control transformer to first solid-state phase shift means, said last-named phase shift means for phase shifting said line frequency, means using the phase shifted line frequency to control a silicon-controlled rectifier bridge circuit so that the firing angles of the two silicon controlled rectifiers of the bridge circuit provide a boost power output from said bridge circuit and a running power output from said bridge circuit by varying the phase shift of said line frequency phase shift network means, and means for selectively connecting the output of said silicon controlled rectifier to the stator of said induction motor.

5. The power supply system of claim 4 including timing means for limiting the time of the phase shift resulting in the boost power to thereby automatically vary the phase shift after a first timer period.

6. An induction motor power supply system such as used for rotating the anode of X-ray tubes, wherein the X-ray tube anode is either driven by the rotor of the induction motor or is the induction motor rotor, said power supply system comprising a first solid state power source for supplying normal power required for driving the rotor of said motor at a first running speed, a second solid state power source for supplying normal power for driving the rotor of said motor at a second running speed, said second speed being higher than said first speed, boost means for increasing the power to the motor for a predetermined period of time above the normal running power to accelerate the motor while attaining said first and second running speeds, means for decreasing said power to the normal running power after said predetermined period of time, means for selectively connecting the stator of said motor to either said first or said second power sources, and braking means for braking said motor when switching from said second speed.

7. The power supply system of claim 6 wherein braking timing means are provided for automatically limiting the operating time of said braking means.

8. The power supply system of claim 6 wherein said braking means comprises a braking relay, means for operating said braking relay responsive to switching off said second solid-state power source, means responsive to the operation of said braking means for deaccelerating the speed of the anode from said second speed to said first speed, and said last-named means comprising means responsive to the operation of the braking relay for operating said first solid-state power source at a boost power condition.

9. The power supply means of claim 8 wherein means are provided automatically time limiting the operating period of said braking relay, whereby said second power source is returned to the running power condition from the boost power condition at the end of a defined time period.

10. An induction motor power supply system such as used for powering the rotating anode of X-ray tubes, wherein the X-ray tube anode is either driven by the motor rotor or is the motor rotor, said power supply system comprising a first solid-state power source for driving the rotor of said motor at a first running speed, a second solid-state power source for driving the rotor of said motor at a second speed, said second speed being higher than said first speed, boost means for accelerating the rotor to said first and second speeds, means for selectively connecting the stator of said motor to either said first or said second power source, control transformer means for coupling to a power line to provide line frequency power, AC-to-DC power supply means coupled to the secondary of said control transformer for supplying direct current power, oscillator means powered from said direct current power for providing a signal having a frequency greater than the line frequency, inverter means driven by said oscillator means to provide a driving power at a frequency higher than line frequency for driving the said rotor, and means for automatically restarting said inverter is said inverter is extinguished.

11. The power supply system of claim 10 wherein said inverter comprises a silicon-controlled rectifier inverter having a first and a second SCR, said first and second SCRs normally operating individually, said oscillator means including inverter driver means having a pair of outputs, each of said outputs being individually coupled to one of the gates of said SCRs alternatively gating said silicon-controlled rectifiers, AC-to-DC converter means coupled to said line power, the output of said AC-to-DC converter means being connected across said first and second SCRs, and said means for restarting said inverter comprising restarting relay coil means connected across the output of said AC-to-DC converter means to keep said restarting relay energized unless both SCRs are gated simultaneously, restarting normally open relay contact means in series with the output of said AC-to-DC converter means for decoupling said AC-to-DC converter means from said silicon-controlled rectifier inverter in the event both of said silicon-controlled rectifiers are gated simultaneously, thereby removing power from the silicon-controlled rectifier inverter means and automatically reenergizing said restarting relay to reconnect said inverter means to said AC-to-DC converter means.

12. The induction motor power supply system of claim 11 wherein said boost means comprises means individual to said second solid-state power source for providing a boosted power output from said second solid-state power source for accelerating the anode so that it reaches the second speed in a relatively small time period.

13. The power supply system of claim 12 wherein the AC-to-DC converter means comprises a pair of silicon-controlled rectifiers, and wherein the boost means individual to said second solid-state power source comprises phase shift network means coupled to the secondary of said control transformer, the output of said phase shift network being coupled to said AC-to-DC converter means for determining the firing angles of the silicon controlled rectifiers in said AC-to-DC converter means and thereby determining the power output from said AC-to-DC converter means.

14. The power supply system of claim 13 including timing means for automatically changing the phase shift after a first period of time to reduce the boosted power to normal running power.

15. An induction motor power supply system such as used for rotating the anode of X-ray tubes, wherein the X-ray tube anode is either driven by the motor rotor or is the motor rotor, said power supply system comprising a first solid-state power source for driving the rotor of said motor at a first speed, a second solid-state power source for driving the rotor of said motor at a second speed, said second speed being higher than said first speed, boost means for accelerating the rotor to said first and second speeds, second solid-state power source switching means for initiating the operation of said second solid-state power source, means for selectively connecting the stator of said motor to either said first or said second power source comprising selection switching means operated responsive to the operation of second solid-state switching means, and means responsive to the operation of said selection switching means for switching the coupling of the stator of the induction motor from the output of said first solid-state power source to the output of said second solid-state power source.

16. The power supply system of claim 15 wherein said selection switching means comprises a selection relay, and wherein said second solid-state power source switching means comprises a second solid-state power source relay means, normally open contacts on said second solid-state power source relay means operating to complete an operating circuit for said selection relay.

17. The power supply system of claim 16 wherein split phase start capacitor means are provided for said induction motor, said split phase capacitor means comprising a first and a second capacitor, means including contacts on said selection relay for connecting said first and second capacitors in parallel when said first power source is connected to the stator of said motor, means including contacts on said switching relay for disconnecting said first capacitor responsive to said second solid-state power source being coupled to the stator of said induction motor.

18. An induction motor supply system such as used for powering X-ray tubes having rotating anodes, wherein the X-ray tube anode is either driven by the motor rotor or is the motor rotor, said power supply system comprising a first solid-state power source for driving the motor of said rotor at a first speed, a second solid-state power source for driving the rotor of said motor at a second speed, said second speed being higher than said first running speed, boost means for increasing the power to the motor above the normal running power to accelerate the rotor while obtaining the first and second running speeds, means for selectively connecting the stator of said motor to either said first or said second power sources, and means for monitoring said boost means to ascertain operation thereof, said monitoring means comprising a combination of series and parallel relays at the interconnection to said stator for determining a boost power condition, monitoring relay means operated responsive to the operation of said series and parallel relay combination to demonstrate the boost power condition.

\* \* \* \* \*